(12) United States Patent
Hempenius et al.

(10) Patent No.: US 9,320,256 B2
(45) Date of Patent: Apr. 26, 2016

(54) METHOD AND SYSTEM FOR MANAGING A GROUP OF DAIRY ANIMALS

(71) Applicant: LELY PATENT N.V., Maassluis (NL)

(72) Inventors: Age Hempenius, Hardegarijp (NL); Ester De Groot, Zoetermeer (NL); Leendert Kool, Stolwijk (NL)

(73) Assignee: LELY PATENT N.V., Maassluis (NL)

( * ) Notice: Subject to any disclaimer, the term of this patent is extended or adjusted under 35 U.S.C. 154(b) by 132 days.

(21) Appl. No.: 14/309,908

(22) Filed: Jun. 20, 2014

(65) Prior Publication Data

US 2014/0311412 A1      Oct. 23, 2014

Related U.S. Application Data

(63) Continuation of application No. PCT/NL2012/050890, filed on Dec. 14, 2012.

(30) Foreign Application Priority Data

Dec. 21, 2011   (NL) ...................................... 2008005

(51) Int. Cl.
*A01K 1/00*     (2006.01)
*A01J 5/007*    (2006.01)
*A01J 5/00*     (2006.01)

(52) U.S. Cl.
CPC .................. *A01K 1/0005* (2013.01); *A01J 5/00* (2013.01); *A01J 5/007* (2013.01)

(58) Field of Classification Search
CPC ............. A01J 5/007; A01J 5/00; A01J 5/017; A01J 5/0175; A01K 1/12; A01K 29/00; A01K 11/006; A01K 29/005
USPC .............. 119/14.02, 174, 14.18, 14.03, 14.08
See application file for complete search history.

(56) References Cited

U.S. PATENT DOCUMENTS 4,517,923 A * 5/1985 Palmer ................... G01G 17/08
                                                          119/51.02
6,659,039 B1 * 12/2003 Larsen ..................... A01K 5/02
                                                          119/51.02

(Continued)

FOREIGN PATENT DOCUMENTS

EP         0677243 A2    10/1995
WO       96/19916 A1     7/1996

(Continued)

OTHER PUBLICATIONS

International Search Report for PCT/NL2012/050890 issued on May 10, 2013.

(Continued)

*Primary Examiner* — Yvonne Abbott-Lewis
(74) *Attorney, Agent, or Firm* — Oblon, McClelland, Maier & Neustadt, L.L.P.

(57) ABSTRACT

A method and system for managing a group of dairy animals in which a subgroup of dairy animals to be separated from the group of dairy animals is determined. A planned collection time is determined, at which time it is planned that the dairy animals in the subgroup of dairy animals to be separated are separated from the group of dairy animals. An individual separation period, which is determined by the length of time from a start time, preceding the planned collection time, to the planned collection time, is selected separately, for each individual dairy animal in the subgroup of dairy animals to be separated, in dependence of a property of said individual dairy animal. Each individual dairy animal in the subgroup of dairy animals to be separated is separated from the group of dairy animals during the individual separation period selected for said dairy animal.

16 Claims, 1 Drawing Sheet

(56) References Cited

U.S. PATENT DOCUMENTS

| | | | | |
|---|---|---|---|---|
| 8,297,231 B2* | 10/2012 | Yanai | ............... | G06F 19/3418 119/174 |
| 8,642,262 B2* | 2/2014 | Stroman | ............... | G06Q 10/063 119/174 |
| 2006/0191485 A1* | 8/2006 | Francke | ............... | A01J 5/007 119/14.03 |
| 2011/0232576 A1* | 9/2011 | Van Der Tol | ............ | A01J 5/007 119/14.02 |
| 2012/0272904 A1* | 11/2012 | Hofman | ............... | A01J 5/017 119/14.02 |

FOREIGN PATENT DOCUMENTS

| | | |
|---|---|---|
| WO | 2004/066720 A1 | 8/2004 |
| WO | 2008/154247 A1 | 12/2008 |

OTHER PUBLICATIONS

International Preliminary Report on Patentability for PCT/NL2012/050890 issued on Jun. 24, 2014.

\* cited by examiner

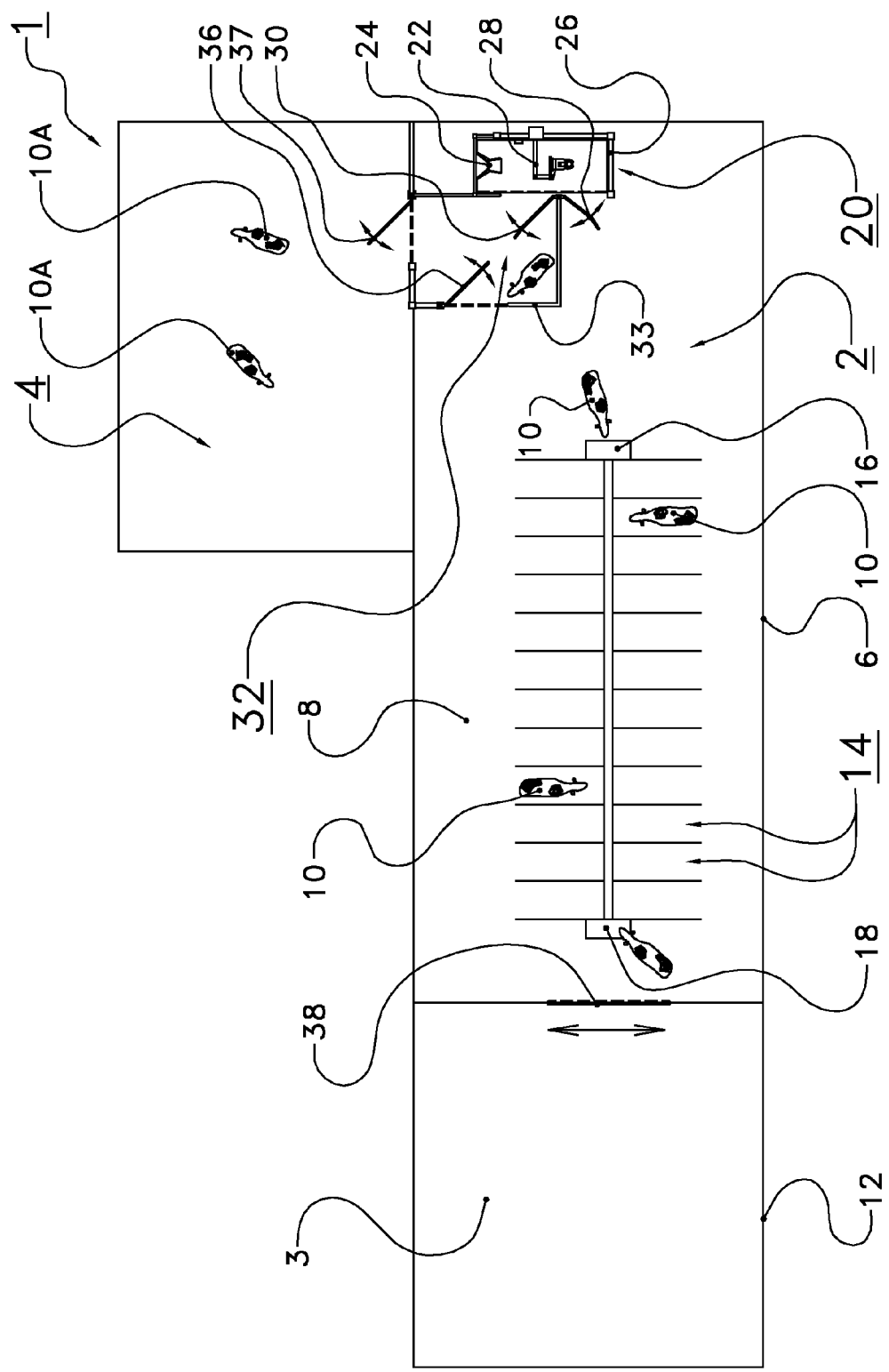

METHOD AND SYSTEM FOR MANAGING A GROUP OF DAIRY ANIMALS

CROSS REFERENCE TO RELATED APPLICATIONS

This application is a continuation of PCT application number PCT/NL2012/050890 filed on 14 Dec. 2012, which claims priority from Netherlands application number 2008005 filed on 21 Dec. 2011. Both applications are hereby incorporated by reference in their entireties.

BACKGROUND OF THE INVENTION

1. Field of the Invention

The invention relates generally to a method for managing a group of dairy animals, comprising:
automatically milking a dairy animal, in the group of dairy animals, which presents itself at the milking station,
determining a subgroup of dairy animals to be separated from the group of dairy animals,
determining a separation period, defined by a start time and an end time, in which the dairy animals in the subgroup of dairy animals to be separated which present themselves at the milking station during the separation period are separated from the group of dairy animals.

2. Description of the Related Art

In automatic milking systems, it is generally known to separate a subgroup of dairy animals which meet a predetermined criterion from a group of dairy animals in a milking shed area, for example to inseminate or give medical treatment to the dairy animals in the subgroup to be separated. In this case, the intention is that the dairy animals to be separated are separated from the other dairy animals in the group at a planned collection time into a separation area which is screened from the milking shed area.

In an automatic milking system, the dairy animals present themselves at a milking station which is provided with a milking robot. In order to separate the dairy animals in the subgroup, a predetermined separation period is set. The separation period is determined by the length of time from a start time, preceding the planned collection time, to the planned collection time. If the dairy animal has presented itself at the milking station outside of the separation period, it is guided back to the group of dairy animals, if appropriate following milking. If, however, the automatic milking occurs during the separation period, it is determined whether said dairy animal belongs in the subgroup to be separated. If that is the case, said dairy animal is subsequently separated. During the separation period, the dairy animals to be separated are therefore directed into the screened separation area, and the dairy animals which are not to be separated are guided back to the milking shed area.

In practice, however, it has been found that the predetermined separation period is not optimal for the dairy animals in the subgroup to be separated. If the separation period is relatively short, there is a risk that not all of the dairy animals to be separated will be collected in the separation area at the planned collection time. On the other hand, a relatively long separation period can lead to relatively long waiting times for the separated dairy animals in the separation area. As a result, the milking interval between two successive milking operations for those separated dairy animals can become so long that the milking behaviour and the milk production of said dairy animals are disrupted.

BRIEF SUMMARY OF THE INVENTION

It is an object of the invention to provide a method and a system for managing a group of dairy animals which improve the separation of a subgroup of dairy animals from the group of dairy animals.

This object is achieved according to the invention by a method for managing a group of dairy animals, comprising:
automatically milking, with a milking station, a dairy animal, of the group of dairy animals, which presents itself at the milking station,
determining a subgroup of dairy animals to be separated from the group of dairy animals,
determining a separation period, defined by a start time and an end time, in which the dairy animals in the subgroup of dairy animals to be separated, which present themselves at the milking station during the separation period, are separated from the group of dairy animals,
wherein an individual separation period, which is determined by the length of time from an individual start time, preceding the end time, to the end time, is selected separately, for each individual dairy animal in the subgroup of dairy animals to be separated, in dependence of a property of said individual dairy animal, and in that said individual dairy animal in the subgroup of dairy animals to be separated is separated from the group of dairy animals when it presents itself at the milking station during the individual separation period selected for said dairy animal.

In the prior art, as described above, a common separation period is selected for all of the dairy animals to be separated. Said separation period is inevitably a compromise, where it is necessary to consider the various properties of the dairy animals to be separated. This gives rise, on the one hand, to the risk that not all of the dairy animals to be separated are actually separated at the planned collection time, since the separation period determined as a compromise is too short for a number of the dairy animals to be separated. It should be noted that, as a result of the voluntary milking, there is no guarantee that every dairy animal will actually be separated. On the other hand, the separation period determined as a compromise may be too long for a number of the dairy animals to be separated, as a result of which the milking behaviour and the milk production of those dairy animals are disrupted. It should also be noted that it is not necessary for the separation periods to be different for each animal, but that said separation periods may also be the same for two or more animals, for example if the relevant property for those animals has the same value. The important point is that the invention provides the possibility of various separation periods.

According to the invention, by contrast, an individual separation period is selected separately for each individual dairy animal in the subgroup of dairy animals to be separated. The individual separation period is therefore not a compromise, but is separately tailored to each dairy animal to be separated. Within the individual separation period selected for said dairy animal, said dairy animal in the subgroup of dairy animals to be separated is separated from the group of dairy animals, whereas outside of this individual separation period said dairy animal is guided back to the group of dairy animals. The fact that the separation period is adapted to each individual dairy animal minimizes the risk that the dairy animals in the subgroup to be separated have not yet been separated at the planned collection time. It is also possible in a simple manner to substantially preclude the situation where one or more dairy animals have to wait, as a result of the separation, for such a long time until the following milking operation that the milking behaviour and the milk production are disrupted. This improves the separation of a subgroup of dairy animals from the group of dairy animals. It should be noted that it is not necessary for all dairy animals to be milked by the milking device. Sometimes milking by hand will be required and sometimes the animals will not have any milk. In principle, however, the intention is for the milking device to milk all of the dairy animals.

It should be noted that it is also possible, in principle, for the subgroup to contain one single dairy animal. Since there is then only one relevant separation period, the advantage of the invention will barely be evident. That will predominantly be the case when there is a plurality of dairy animals in the subgroup. The subgroup therefore advantageously comprises a plurality of dairy animals.

According to the invention, it is possible for each dairy animal to have an individual desired milking interval, which is determined by the desired length of time between two successive milking operations for said dairy animal, wherein the individual separation period is selected separately, for each individual dairy animal in the subgroup of dairy animals to be separated, in dependence of the individual desired milking interval for said dairy animal. Selecting the individual desired milking interval as the property of said individual dairy animal which is used as the basis for selecting the individual separation period makes the separation method particularly reliable and animal-friendly. It is therefore possible to take into account, in an optimum manner, said milking interval and in particular the differences in milking interval between individual animals, so that an animal with a short desired milking interval does not have to remain separated for an unnecessarily long time because there is also a dairy animal with a long desired milking interval, in which case a long separation period would have been set, as is the case in the prior art. The individual separation periods are now independent of one another. It should be noted that a desired milking frequency (in number of milking operations per 24 hours) is sometimes selected, rather than a desired milking interval. These are of course equivalent, since "desired milking interval"="24 hours/desired milking frequency".

The individual separation period is, for example, at least equal to part of the individual desired milking interval for said dairy animal, in particular at least equal to the individual desired milking interval for said dairy animal. The part of the milking interval may relate to a percentage of 80%, for example, with it being possible to select this percentage in particular individually for each animal. It is therefore possible, for example, to take into account a longer treatment time, so that the resulting increase in the milking interval does not have a disadvantageous effect. In the case of a lower percentage, there is of course a greater risk that a dairy animal will not present itself at the milking station and will therefore also not be separated.

It is possible, in particular, for the individual separation period to be at least equal to the sum of the individual desired milking interval for said dairy animal and a predetermined length of time and/or a predetermined percentage of the individual desired milking interval for said dairy animal. The individual separation period is thus selected in each case in dependence of the individual desired milking interval, with it being possible to accurately set the individual separation period. It should be noted that the sum of the milking interval plus a negative percentage thereof is equal to the complementary part of the milking interval, for example "milking interval+−15% of the interval"="85% of the milking interval". It is therefore also possible to use part of the milking interval as the separation period.

According to the invention, it is alternatively possible for each dairy animal to have an individual average milking interval, which is determined by the average of a plurality of measured values for the length of time between two successive milking operations for said dairy animal, wherein the individual separation period is selected separately, for each individual dairy animal in the subgroup of dairy animals to be separated, in dependence of the individual average milking interval for said dairy animal. Selecting the individual average milking interval as the property of said individual dairy animal which is used as the basis for selecting the individual separation period means that the separation method is based on historical data relating to said individual dairy animal. This results in a particularly reliable separation of the dairy animals to be separated, without adversely affecting the process of milking the group of dairy animals. It may be the case, for example, that a dairy animal does indeed have a short desired milking interval, but that it often does not present itself at the milking station on time. In practice, therefore, the actual milking interval will differ significantly from the desired milking interval, and the latter thus represents a less reliable basis for the most advantageous separation period.

In this case, it is possible for the individual separation period to be at least equal to the individual average milking interval for said dairy animal. The individual separation period is, for example, at least equal to the sum of the individual average milking interval for said dairy animal and a predetermined length of time and/or a predetermined percentage of the individual average milking interval for said dairy animal and/or a length of time which is dependent on the dispersion of the individual average milking interval for said dairy animal. A separation period based on the individual average milking interval and the dispersion thereof represents, in particular, a good basis for calculating a practical separation period. Here, the individual separation period is in each case selected in dependence of the individual average milking interval, with it being possible to accurately fine-tune the individual separation period.

In addition, it is possible according to the invention for each dairy animal to have an individual average visiting interval, which is determined by the average of a plurality of measured values for the length of time between two successive visits to the milking station for said dairy animal, wherein the individual separation period is selected separately, for each individual dairy animal in the subgroup of dairy animals to be separated, in dependence of the individual average visiting interval for said dairy animal. Selecting the individual average visiting interval as the property of said individual dairy animal which is used as the basis for selecting the individual separation period means that the separation method is based on historical data relating to said individual dairy animal. This takes into account how often each individual dairy animal presents itself at the milking station, even if said dairy animal is not milked. This leads to a further refinement of the separation of the dairy animals to be separated, without adversely affecting the process of milking the group of dairy animals.

In this case, it is possible for the individual separation period to be at least equal to the individual average visiting interval for said dairy animal. For example, the individual separation period is at least equal to the sum of the individual average visiting interval for said dairy animal and a predetermined length of time and/or a predetermined percentage of the individual average visiting interval for said dairy animal and/or a length of time which is dependent on the statistical dispersal (spread) of the individual average visiting interval for said dairy animal. This offers the possibility of accurately adapting the individual separation period to the properties of the dairy animals in the group. In the case of a dairy animal which appears to have a high and preferably reliable visiting frequency, i.e. with a low dispersion, it is therefore preferable not to separate the dairy animal when it is milked at the start of a separation period determined solely in dependence of the milking interval, since the dairy animal will subsequently return to the milking station before the desired separation time, with a high degree of reliability. It is therefore still possible to separate the dairy animal in time, without it needing to be enclosed for too long.

The invention also relates to a system for managing a group of dairy animals using a method according to the invention, in particular comprising:

an accommodation area for the dairy animals of the group of dairy animals, for example a shed area and/or a grazing area, in which accommodation area the dairy animals in the group of dairy animals can preferably roam substantially freely, a separation area for separating thereinto a subgroup of dairy animals from the group of dairy animals, a distribution area, which adjoins the accommodation area and adjoins the separation area, which distribution area is provided with a distribution device, which is actuable between an accommodation state, in which a dairy animal is guidable to the accommodation area, and a separation state, in which a dairy animal is guidable to the separation area, a milking station for automatically milking the dairy animals in the group of dairy animals, which milking station is arranged in the accommodation area, an identification device for identifying the dairy animals in the group of dairy animals and supplying an animal identification signal, a control unit, which is configured to determine a subgroup of dairy animals to be separated from the group of dairy animals, for example by directly inputting the dairy animals to be separated or by inputting a criterion for the dairy animals to be separated, which control unit is provided with an input device for inputting a separation period, defined by a start time and an end time, in which the dairy animals in the subgroup of dairy animals to be separated which present themselves at the milking station during the separation period are separated from the group of dairy animals, and which control unit is connected to the identification device for receiving the animal identification signal and is connected to the distribution device for actuating said distribution device between the accommodation state and the separation state, wherein the control unit is configured to separately select, for each individual dairy animal in the subgroup of dairy animals to be separated and in dependence of a property of said individual dairy animal, an individual separation period, which is determined by the length of time from an individual start time, preceding the end time, to the end time, and in that the control unit is configured to actuate the distribution device in such a way that an individual dairy animal, in the subgroup of dairy animals to be separated, which presents itself at the milking station during the individual separation period selected for said dairy animal, is separated from the group of dairy animals into the separation area.

The system according to the invention has the same advantages as described above for the method according to the invention. The system according to the invention can also be combined with one or more of the properties described above for the method according to the invention. It should be noted that it should be possible for the distribution area to be limited to the area in which the distribution device can move, such as a space for movable railings. There can of course be no guarantee, in the case of the system too, that every animal will be separated on time, but the system is capable of achieving this. In the event that it is not possible to separate an animal on time, there is of course still the possibility of the farmer or other person retrieving and separating said animal.

It is possible, according to the invention, for the identification device to be arranged in the milking station. By identifying each dairy animal in the milking station, it is possible for the control unit to determine whether said dairy animal belongs in the subgroup of dairy animals to be separated. If said dairy animal belongs in the subgroup of dairy animals to be separated and the automatic milking is carried out during the individual separation period for said dairy animal, said dairy animal is separated into the separation area immediately after the automatic milking, by actuating the distribution device with the aid of the control unit.

The accommodation area may, however, also be provided with at least one feeding device. In this case, the identification device can be arranged on the feeding device. After a dairy animal to be separated has presented itself at the feeding device during the individual separation period for said dairy animal, and this has been determined by means of the identification device, said dairy animal can be guided from the feeding device to the separation area, by actuating the distribution device with the aid of the control unit.

BRIEF DESCRIPTION OF THE DRAWINGS

The features and advantages of the invention will be appreciated upon reference to the following drawings, in which:

FIG. 1 diagrammatically shows an exemplary embodiment of a system and method for managing a group of dairy animals according to the invention.

DESCRIPTION OF ILLUSTRATIVE EMBODIMENTS

The following is a description of certain embodiments of the invention, given by way of example only and with reference to the drawings. The system for managing a group of dairy animals 10 according to the invention is indicated in its entirety by reference numeral 1 in FIG. 1. The system 1 comprises a shed area 2 and a grazing area 3 for the dairy animals 10. The shed area 2 is surrounded by a wall 6. The wall 6 delimits an interior area 8 of the shed area 2, in which a plurality of cubicles 14, a concentrated feed trough 16 and a drinking water trough 18 are arranged. The grazing area 3 is delimited by means of a fence 12. The grazing area 3 is provided with grass (not shown). The grazing area 3 can be accessed from the interior area 8 of the shed area 2 via an opening in the wall 6, which can be closed by means of a shed door 38. When the shed door 38 is open, the grazing area 3 and the shed area 2 together form an accommodation area for the group of dairy animals 10. In the case of a closed shed door 38, the shed area 2 forms the accommodation area for the group of dairy animals 10. It should be noted that it is also possible to provide a selectively opening gate between the shed area 2 and the grazing area 3. This gate only opens for an animal, for example, when less than a predetermined part of the desired milking interval which applies to said animal has passed since the most recent milking operation for said animal. This increases the chance that the animal will not be too far away from the milking station when the desired milking interval elapses. It is also possible to only allow the gate to open if there is either still a predetermined minimum time until the desired end time of the separation period for said animal, or if at most a predetermined part of the separation period which applies to said animal has passed. It is therefore possible to prevent the animal from moving too far away from the milking station by the time the end time is reached. The chance for effective separation is thus not negatively influenced by the animals roaming too far.

The system 1 further comprises a milking station 20 for automatically milking each dairy animal 10 in the group of dairy animals 10. The milking station 20 is installed in the shed area 2. The milking station 20 is screened from the interior area 8 of the shed area 2 by means of railings 26. The milking station 20 comprises a robot arm 22 and a second concentrated feed trough 24. The milking station 20 comprises an access door 28 and an exit door 30. The access door 28 and the exit door 30 can each be actuated remotely, for example, between an open and a closed state.

In this exemplary embodiment, the exit door 30 of the milking station 20 opens out into a distribution area 32. The distribution area 32 is delimited by a railing 33, which is provided with a return door 36 and a separation door 37. Both the return door 36 and the separation door 37 can be actuated remotely, for example, between an open and a closed state. When the return door 36 is in the open state, the distribution area 32 is connected to the interior area 8 of the shed area 2. When the separation door 37 is in the open state, it leads from the distribution area 32 to the separation area 4.

The system 1 is provided with a control unit. The control unit is formed by a computer, for example. The control unit actuates the milking station 20, and also controls the return door 36 and the separation door 37 of the distribution area 32. The control unit may also be in the form of separate computers. In addition, the control unit is connected to an identification device for identifying each dairy animal in the group of dairy animals 10. The identification device comprises a plurality of identification sensors, for example, which are arranged at the access door 28, the feed troughs 16 and 24 and the doors 36, 37. Preferably, the drinking trough 18 is also provided with an identification sensor. The identification sensors are configured to work together with identification means provided on each dairy animal 10. The identification means comprises an RFID device, for example.

The separation of a subgroup of dairy animals 10A from the group of dairy animals 10 is carried out as follows.

The subgroup of dairy animals 10A to be separated is determined in the control unit. The dairy animals 10A to be separated can be input directly into the control unit, for example. It is also possible to input a criterion into the control unit, in dependence of which the control unit determines which dairy animals 10A in the group of dairy animals 10 must be separated. In addition, a planned collection time is input into the control unit, at which collection time it is planned that the dairy animals 10A in the subgroup of dairy animals to be separated are separated from the group of dairy animals 10 in the accommodation area 2, 3.

Furthermore, the control unit separately determines an individual separation period, which is defined by the length of time from a start time, preceding the planned collection time, to the planned collection time, for each individual dairy animal 10A in the subgroup of dairy animals 10A to be separated. The individual separation period for each individual dairy animal 10A is selected in dependence of a property of said individual dairy animal 10A.

For example, the individual separation period is selected in dependence of the individual desired milking interval for said dairy animal 10A, which is determined by the desired length of time between two successive milking operations by the milking station 20 for said dairy animal 10A. In this case, the individual separation period can be at least equal, for example, to the individual desired milking interval for said dairy animal 10A or at least equal to the sum of the individual desired milking interval for said dairy animal 10A and a predetermined length of time and/or a predetermined percentage of the individual desired milking interval for said dairy animal 10A.

As an alternative, the individual separation period can be selected in dependence of the individual average milking interval for said dairy animal 10A, which is determined by the average of a plurality of measured values for the length of time between two successive milking operations by the milking station 20 for said dairy animal 10A.

In this case, it is possible for the individual separation period to be at least equal to the individual average milking interval for said dairy animal 10A. For example, the individual separation period can be at least equal to the sum of the individual average milking interval for said dairy animal 10A and a predetermined length of time and/or a predetermined percentage of the individual average milking interval for said dairy animal 10A and/or a length of time which is dependent on the dispersion of the individual average milking interval for said dairy animal.

In a further alternative, the individual separation period is selected in dependence of the individual average visiting interval for said dairy animal 10A, which is determined by the average of a plurality of measured values for the length of time between two successive visits to the milking station 20 for said dairy animal 10A.

According to this further alternative, it is possible for the individual separation period to be at least equal to the individual average visiting interval for said dairy animal 10A. For example, the individual separation period is at least equal to the sum of the individual average visiting interval for said dairy animal 10A and a predetermined length of time and/or a predetermined percentage of the individual average visiting interval for said dairy animal 10A and/or a length of time which is dependent on the dispersion of the individual average visiting interval for said dairy animal 10A.

The dairy animals 10 can roam substantially freely in the interior area 8 of the shed area 2. The dairy animals 10 present themselves voluntarily at the milking station 20 to be automatically milked. When a dairy animal 10 presents itself at the milking station 20, the dairy animal is identified at the access door 28 and/or at the feed trough 24. The control unit can thereby determine whether the dairy animal 10 belongs in the subgroup of dairy animals 10A to be separated. It should be noted that the ability to roam freely is not a requirement of the invention. It is sufficient if the animals can reach the milking station of their own accord, even if there are routes prescribed for this purpose, as in the case of so-called "forced cow traffic".

If the dairy animal 10 does not need to be separated, the control unit actuates the return door 36 into the open state and the separation door 37 into the closed state. The dairy animal 10, which leaves the milking station 20 via the exit door 30, will thereby be guided back via the return door 36 to the interior area 8 of the shed area 2.

If, on the other hand, the identification at the access door 28 and/or at the feed trough 24 of the milking station 20 reveals that the dairy animal belongs in the subgroup of dairy animals 10A to be separated, the control unit subsequently determines whether said dairy animal 10A is at that point in time within the individual separation period for said dairy animal 10A. The individual separation period for said dairy animal 10A is stored in the control unit.

If the dairy animal 10A is at that point in time within the individual separation period for said dairy animal 10A, the control unit moves the return door 36 into the closed state and the separation door 37 into the open state. The dairy animal 10A to be separated is therefore subsequently routed into the separation area 4.

However, if the dairy animal 10A, at the time of identification at the access door 28 and/or at the feed trough 24 of the milking station 20, is not yet within the individual separation period for said dairy animal, the control unit ensures that the return door 36 is in the open state and that the separation door 37 is in the closed state. The dairy animal 10A, which leaves the milking station 20 via the exit door 30, is thereby guided back to the interior area 8 of the shed area 2 via the return door 36.

If the same dairy animal 10A later returns to the milking station 20 to be milked, the control unit once again determines whether said dairy animal 10A is at that point in time within the individual separation period for said dairy animal 10A. If this is the case at that point in time, the return door 36 is closed by the control unit and the separation door 37 is opened by the control unit. Before this, the dairy animal 10A is milked one further time. Afterwards, the dairy animal 10A is separated into the separation area 4.

The invention is not limited to the exemplary embodiment shown in the drawing. The person skilled in the art can make various modifications which are within the scope of the invention. For example, the return door 36 and the separation door 37 can be integrated into a single door which is displaceable between a first state, in which the door provides access to the accommodation area and simultaneously closes off the separation area, and a second state, in which the door provides access to the separation area and simultaneously closes off the accommodation area. It is also possible, for example, to carry out the separation prior to the milking. In that case, the distribution area is located in front of the access door of the milking station. In addition, the separation can be carried out at another location in the system, for example at a feeding station, such as the feed trough 16 or the drinking water trough 18.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for managing a group of dairy animals, comprising:
automatically milking, with a milking station, a dairy animal, of the group of dairy animals, which presents itself at the milking station,
determining a subgroup of dairy animals to be separated from the group of dairy animals,
determining a separation period, defined by a start time and an end time, in which the dairy animals in the subgroup of dairy animals to be separated which present themselves at the milking station during the separation period are separated from the group of dairy animals,
wherein an individual separation period, which is determined by a length of time from an individual start time, preceding the end time, to the end time, is selected separately, for each individual dairy animal in the subgroup of dairy animals to be separated, in dependence of a property of said individual dairy animal, and in that said individual dairy animal in the subgroup of dairy animals to be separated is separated from the group of dairy animals when it presents itself at the milking station during the individual separation period selected for said dairy animal.

2. The method according to claim 1, wherein each dairy animal has an individual desired milking interval, which is determined by a desired length of time between two successive milking operations for said dairy animal, and wherein the individual separation period is selected separately, for each individual dairy animal in the subgroup of dairy animals to be separated, in dependence of the individual desired milking interval for said dairy animal.

3. The method according to claim 2, wherein the individual separation period is at least equal to the individual desired milking interval for said dairy animal.

4. The method according to claim 2, wherein the individual separation period is at least equal to the sum of the individual desired milking interval for said dairy animal and a predetermined length of time.

5. The method according to claim 2, wherein the individual separation period is at least equal to the sum of the individual desired milking interval for said dairy animal and a predetermined percentage of the individual desired milking interval for said dairy animal.

6. The method according to claim 1, wherein each dairy animal has an individual average milking interval, which is determined by the average of a plurality of measured values for the length of time between two successive milking operations for said dairy animal, and wherein the individual separation period is selected separately, for each individual dairy animal in the subgroup of dairy animals to be separated, in dependence of the individual average milking interval for said dairy animal.

7. The method according to claim 6, wherein the individual separation period is at least equal to the individual average milking interval for said dairy animal.

8. The method according to claim 6, wherein the individual separation period is at least equal to the sum of the individual average milking interval for said dairy animal and a predetermined length of time.

9. The method according to claim 6, wherein the individual separation period is at least equal to the sum of the individual average milking interval for said dairy animal and a predetermined percentage of the individual average milking interval for said dairy animal.

10. The method according to claim 6, wherein the individual separation period is at least equal to the sum of the individual average milking interval for said dairy animal and a length of time which is dependent on a dispersion of the individual average milking interval for said dairy animal.

11. The method according to claim 1, wherein each dairy animal has an individual average visiting interval, which is determined by the average of a plurality of measured values for the length of time between two successive visits to the milking station for said dairy animal, and wherein the individual separation period is selected separately, for each individual dairy animal in the subgroup of dairy animals to be separated, in dependence of the individual average visiting interval for said dairy animal.

12. The method according to claim 11, wherein the individual separation period is at least equal to the individual average visiting interval for said dairy animal.

13. The method according to claim 11, wherein the individual separation period is at least equal to the sum of the individual average visiting interval for said dairy animal and a predetermined length of time.

14. The method according to claim 11, wherein the individual separation period is at least equal to the sum of the individual average visiting interval for said dairy animal and a predetermined percentage of the individual average visiting interval for said dairy animal.

15. The method according to claim 11, wherein the individual separation period is at least equal to the sum of the individual average visiting interval for said dairy animal and a length of time which is dependent on the dispersion of the individual average visiting interval for said dairy animal.

16. A system for managing a group of dairy animals according to the method of claim 1, comprising:
- an accommodation area for the dairy animals of the group of dairy animals, in which accommodation area the dairy animals of the group of dairy animals can preferably roam substantially freely,
- a separation area for separating thereinto a subgroup of dairy animals from the group of dairy animals,
- a distribution area, which adjoins the accommodation area and adjoins the separation area, which distribution area is provided with a distribution device, which is actuable between an accommodation state, in which a dairy animal is guidable to the accommodation area, and a separation state, in which a dairy animal is guidable to the separation area,
- a milking station for automatically milking the dairy animals, which milking station is arranged in the accommodation area,
- an identification device for identifying the dairy animals in the group of dairy animals and supplying an animal identification signal,
- a control unit, which is configured to determine a subgroup of dairy animals to be separated from the group of dairy animals, which control unit is provided with an input device for inputting a separation period, defined by a start time and an end time, in which the dairy animals in the subgroup of dairy animals to be separated which present themselves at the milking station during the separation period are separated from the group of dairy animals, and which control unit is connected to the identification device for receiving the animal identification signal and is connected to the distribution device for actuating said distribution device between the accommodation state and the separation state, wherein the control unit is configured to separately select, for each individual dairy animal in the subgroup of dairy animals to be separated and in dependence of a property of said individual dairy animal, an individual separation period, which is determined by a length of time from an individual start time, preceding the end time, to the end time, and in that the control unit is configured to actuate the distribution device so that an individual dairy animal, in the subgroup of dairy animals to be separated, which presents itself at the milking station during the individual separation period selected for said dairy animal, is separated from the group of dairy animals into the separation area.

* * * * *